US008710160B2

United States Patent
Schmidt et al.

(10) Patent No.: US 8,710,160 B2
(45) Date of Patent: Apr. 29, 2014

(54) PROCESS FOR THE PREPARATION OF ETHYLENE HOMOPOLYMERS OR COPOLYMERS IN A HIGH-PRESSURE REACTOR CONTROLLED BY A MODEL BASED PREDICTIVE CONTROLLER

(75) Inventors: Christian-Ulrich Schmidt, Bonn (DE); Klaus Berhalter, Bornheim-Dersdorf (DE); Steve Makin, Cheshire (EP); Kevin Taylor, Manchester (EP)

(73) Assignee: Basell Polyoefine GmbH, Wesseling (DE)

( * ) Notice: Subject to any disclaimer, the term of this patent is extended or adjusted under 35 U.S.C. 154(b) by 0 days.

(21) Appl. No.: 13/516,703

(22) PCT Filed: Dec. 20, 2010

(86) PCT No.: PCT/EP2010/007786
§ 371 (c)(1),
(2), (4) Date: Aug. 13, 2012

(87) PCT Pub. No.: WO2011/076372
PCT Pub. Date: Jun. 30, 2011

(65) Prior Publication Data
US 2012/0322956 A1    Dec. 20, 2012

Related U.S. Application Data

(60) Provisional application No. 61/338,843, filed on Feb. 24, 2010.

(30) Foreign Application Priority Data

Dec. 22, 2009   (EP) .................................... 09015856

(51) Int. Cl.
*C08F 2/00* (2006.01)
*C08F 4/28* (2006.01)
*C08F 10/00* (2006.01)
*C08F 110/02* (2006.01)

(52) U.S. Cl.
USPC .............. 526/60; 526/227; 526/348; 526/352

(58) Field of Classification Search
USPC ................................... 526/60, 227, 348, 352
See application file for complete search history.

(56) References Cited

FOREIGN PATENT DOCUMENTS

| CN | 1046618 A | 10/1990 |
|---|---|---|
| WO | WO-96/41822 | 12/1996 |
| WO | WO-2004040283 | 5/2004 |
| WO | WO-2004/078800 | 9/2004 |
| WO | WO 2008/064843 | * 6/2008 |
| WO | WO-2008064843 | 6/2008 |

OTHER PUBLICATIONS

Schmidt, U et al., "Model Application in the Polyolefin Industry ", 7th Int. Workshop on PRE, Hamburg 8-10 Dechema Monographs vol. 137, Wiley-VCH, Oct. 2001, 147.
"Ind. Eng Chem. Res. 44", 2005 , 8.

* cited by examiner

*Primary Examiner* — William Cheung (57) ABSTRACT

Process for the preparation of ethylene homopolymers or copolymers in the presence of free-radical polymerization initiator at from 100° C. to 350° C. and pressures in the range of from 160 MPa to 350 MPa in a high-pressure polymerization unit comprising a high-pressure reactor with one or more reaction zones, to each of which free-radical polymerization initiator is fed, which is controlled by a model based predictive controller carrying out the steps.

12 Claims, 2 Drawing Sheets

PROCESS FOR THE PREPARATION OF ETHYLENE HOMOPOLYMERS OR COPOLYMERS IN A HIGH-PRESSURE REACTOR CONTROLLED BY A MODEL BASED PREDICTIVE CONTROLLER

This application is the U.S. national phase of International Application PCT/EP2010/007786, filed Dec. 20, 2010, claiming priority to European Application 09015856.9 filed Dec. 22, 2009, and the benefit under 35 U.S.C. 119(e) of U.S. Provisional Application No. 61/338,843, filed Feb. 24, 2010; the disclosures of International Application PCT/EP2010/007786, European Application 09015856.9 and U.S. Provisional Application No. 61/338,843, each as filed, are incorporated herein by reference.

DESCRIPTION

The present invention relates to a process for the preparation of ethylene homopolymers or copolymers in the presence of free-radical polymerization initiator at from 100° C. to 350° C. and pressures in the range of from 160 MPa to 350 MPa in a high-pressure reactor with one or more reaction zones, to each of which free-radical polymerization initiator is fed, in a high-pressure reactor using a model based predictive controller, to a method for controlling such a process for the preparation of ethylene homopolymers or copolymers and to a method for transitioning from one grade to another using this method for controlling the process for the preparation of ethylene homopolymers or copolymers.

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE). LDPE is a versatile polymer which can be used in a variety of applications, such as film, coating, molding, and wire and cable insulation. There is consequently still demand for optimizing the processes for its preparation.

A normal set-up for a high-pressure LDPE polymerization unit consists essentially of a set of two compressors, a primary and a high pressure compressor, a polymerization reactor and two separators for separating the monomer-polymer mixture leaving the high-pressure reactor, wherein in the first separator, the high pressure separator, the ethylene separated from the monomer-polymer mixture is recycled to the ethylene-feed between the primary compressor and the high pressure compressor and the ethylene separated from the mixture in the second separator, the low pressure separator, is added to the stream of fresh ethylene before it is fed to the primary compressor. Such a high-pressure polymerization unit normally further includes apparatuses like extruders and granulators for pelletizing the obtained polymer. Common high-pressure LDPE reactors are either tubular reactors or autoclave reactors. Both types of reactors have frequently more than one injection point for initiators, thus creating multiple reaction zones. Monomer supply to the high-pressure reactor can either be carried out solely in the beginning of the reactor or only partly in the beginning with the other part fed via one or more side feed entries. It is further common, to use initiator mixtures. WO 2004/078800 describes a method of selecting initiator mixtures with respect to minimum initiator costs, for instance.

The polymerization process in a high-pressure reactor is carried out at pressures which can reach even 350 MPa. Such high pressure requires special technology for the process to be handled in a safe and reliable manner. Moreover, it needs a lot of energy to compress the monomers to the high pressures of the reaction.

The properties and the structure of the obtained ethylene homopolymers or copolymers, such as molecular weight, molecular weight distribution and the amount of short- and long-chain branching, depend strongly on the reaction parameters like pressure and temperature. That means, control of the reaction conditions is essential. There are also additional possibilities to influence the nature of the produced polymers, for example the addition of chain-transfer agents, which reduce the molecular weight, or the addition of one or more comonomers. A further limiting factor for the production of ethylene homopolymers or copolymers is heat removal from the reactor, because the heat of polymerization of ethylene is relatively high.

For various chemical processes including some polymerization processes it has been possible to use advanced process control methods to operate production processes with closed-loop control. WO 96/41822 discloses a control method for processes of synthesis of chemical products in a reactor which can be assimilated to be a perfectly mixed reactor. WO 2004/040283 describes chemical manufacturing process control which is capable of making homopolymers, random copolymers and impact copolymers of polypropylene. The high-pressure polymerization of ethylene has however not yet been accessible for such control methods. Reasons for that could have been that small deviations in the process can result in high temperature fluctuations in the reactor. However, if the temperature rises too much, there is the risk that ethylene decomposes to carbon and a mixture of methane and hydrogen, which leads to rapidly increasing pressure in the reactor requiring an emergency shut-down of the reactor via a relief valve or a burst disk. This is highly undesirable. Moreover, free-radical initiated polymerization of ethylene in a high-pressure reactor is a fast running process. Mean residence times of the reaction mixture are in commercially operated high-pressure reactors in the range of from about 1 to about 5 minutes. That means, finding a possibility for using an advanced process control method for operating the high-pressure polymerization of ethylene in a high-pressure reactor could be a way to improve product quality and automate grade changes and to increase production rate and reduce energy consumption. Consequently, it is an object of the present invention to overcome the mentioned hurdles and to find a process for the preparation of ethylene homopolymers or copolymers in a high-pressure reactor using a model based predictive controller, which enables reliable production of the ethylene homopolymers or copolymers within a narrower quality specification, which makes grade changes easier and allows for carrying out the polymerization with maximized production rate and minimized energy consumption.

We have found that this object is achieved by a process for the preparation of ethylene homopolymers or copolymers in the presence of free-radical polymerization initiator at from 100° C. to 350° C. and pressures in the range of from 160 MPa to 350 MPa in a high-pressure polymerization unit comprising a high-pressure reactor with one or more reaction zones, to each of which free-radical polymerization initiator is fed, which is controlled by a model based predictive controller carrying out the steps a) feeding target values for density and melt flow rate (MFR) of the ethylene homopolymer to be prepared as setpoint ranges to the controller if an ethylene homopolymers is prepared or feeding target values for density, MFR and copolymer composition of the ethylene copolymer of to be prepared as setpoint ranges to the controller if an ethylene copolymer is prepared;

b) measuring data in the high-pressure polymerization unit and calculating by means of a model based on these data a value for the density of the ethylene homopolymer or copolymer currently prepared in the high-pressure reactor;

c) independently of step b), measuring data in the high-pressure polymerization unit and calculating by means of a model based on these data a value for the MFR of the ethylene homopolymer or copolymer currently prepared in the high-pressure reactor;

d) if an ethylene copolymer is prepared, independently of steps b) and c), measuring data in the high-pressure polymerization unit and calculating by means of a model based on these data a value for the copolymer composition of the ethylene copolymer currently prepared in the high-pressure reactor;

e) feeding the calculated values for the density, for the MFR and, if an ethylene copolymer is prepared, for the copolymer composition as controlled variables to the controller; and f) measuring data in the high-pressure polymerization unit and calculating by means of the controller based on these measured data, the setpoint ranges fed in step a) and the values calculated in steps b), c) and d) as outputs setpoint ranges for manipulated variables of the high-pressure polymerization unit including setpoint ranges for feeding the free-radical polymerization initiator, wherein the calculation of the setpoint ranges for feeding the free-radical polymerization initiator is repeated at least every 3 minutes.

Furthermore, we have found a method for controlling a process for the preparation of ethylene homopolymers or copolymers in the presence of free-radical polymerization initiator at from 100° C. to 350° C. and pressures in the range of from 160 MPa to 350 MPa in a high-pressure reactor with one or more reaction zones, to each of which free-radical polymerization initiator is fed, using a model based predictive controller and a method for transitioning from one grade to another using this method for controlling a process for the preparation of ethylene homopolymers or copolymers in the presence of free-radical polymerization initiator.

BRIEF DESCRIPTION OF THE SEVERAL VIEWS OF THE DRAWINGS

The features and advantages of the present invention can be better understood via the following description and the accompanying drawings, where.

The process of the invention can be used both for the homopolymerization of ethylene and for the copolymerization of ethylene with one or more other monomers, provided that these monomers are free-radically copolymerizable with ethylene under high pressure. Examples of suitable copolymerizable monomers are $\alpha,\beta$-unsaturated $C_3$-$C_8$-carboxylic acids, in particular maleic acid, fumaric acid, itaconic acid, acrylic acid, methacrylic acid and crotonic acid, derivatives of $\alpha,\beta$-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, particularly preferably vinyl acetate, can be used as comonomers. n-Butyl acrylate, acrylic acid or methacrylic acid are particularly advantageously used as comonomer. In the case of copolymerization, the proportion of comonomer or comonomers in the reaction mixture is from 1 to 45% by weight, preferably from 3 to 30% by weight, based on the amount of monomers, i.e. the sum of ethylene and other monomers. Depending on the type of comonomer, it can be preferred to feed the comonomers at a plurality of different points to the reactor.

For the purposes of the present invention, polymers are all substances which are made up of at least two monomer units. They are preferably LDPE polymers having an average molecular weight $M_n$ of more than 20 000 g/mole. However, the method of the invention can also be advantageously employed in the preparation of oligomers, waxes and polymers having a molecular weight $M_n$ of less than 20 000 g/mole.

Possible initiators for starting the free-radical polymerization in the respective reaction zones are, for example, air, oxygen, azo compounds or peroxidic polymerization initiators. Initiation using organic peroxides or azo compounds represents a particularly preferred embodiment of the process of the invention. Examples of suitable organic peroxides are peroxy esters, peroxy ketals, peroxy ketones and peroxycarbonates, e.g. di(2-ethylhexyl)peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert butyl peroxy-2 ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyhtriperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using di-tert-butyl peroxide.

The initiators can be employed individually or as a mixture in concentrations of from 0.1 to 50 mol/t of polyethylene produced, in particular from 0.2 to 20 mol/t, in each reaction zone. In a preferred embodiment of the present invention the free-radical polymerization initiator, which is fed to a reaction zone, is a mixture of at least two different azo compounds or organic peroxides. If such initiator mixtures are used it is preferred that these are fed to all reaction zones. There is no limit for the number of different initiators in such a mixture, however preferably the mixtures are composed of from two to six and in particular of four or five different initiators. Particular preference is given to using mixtures of initiators which have different decomposition temperatures.

It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight.

In the process of the invention, the molecular weight of the polymers to be prepared can as usual be altered by addition of modifiers which act as chain-transfers agents. Examples of suitable modifiers are hydrogen, aliphatic and olefinic hydrocarbons, e.g. pentane, hexane, cyclohexane, propene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or 1-olefins such as propene or 1-hexene.

The reaction mixture generally comprises polyethylene in an amount in the range of from 0 to 45% by weight, based on the total monomer-polymer mixture, preferably from 0 to 35% by weight.

The process of the invention is carried out at pressures of from 160 MPa to 350 MPa, with pressures of from 180 MPa to 340 MPa being preferred and pressures of from 200 MPa to 330 Pa being particularly preferred. The temperatures are in the range from 100° C. to 350° C., preferably from 120° C. to 340° C. and very particularly preferably from 150° C. to 320° C. In the case of copolymerization of ethylene with sensitive or strongly regulating comonomers, in particular free radically polymerizable carboxylic esters, e.g. vinyl esters, the polymerization is preferably carried out at temperatures below 230° C. In general, preference is given to a process in which the polymerization temperature is not higher than 320° C.

The process of the present invention can be carried out with all types of high pressure reactors having one or more reaction zones, preferably from 2 to 6 reaction zones and particularly preferably from 3 to 5 reaction zones. The number of reaction zones is given by the number of injection points for the initiator. That means, in each reaction zone polymerization is initiated by addition of initiators which decompose into free radicals. Suitable high pressure reactors are, e.g., tubular reactors or autoclave reactors.

Figure 1:
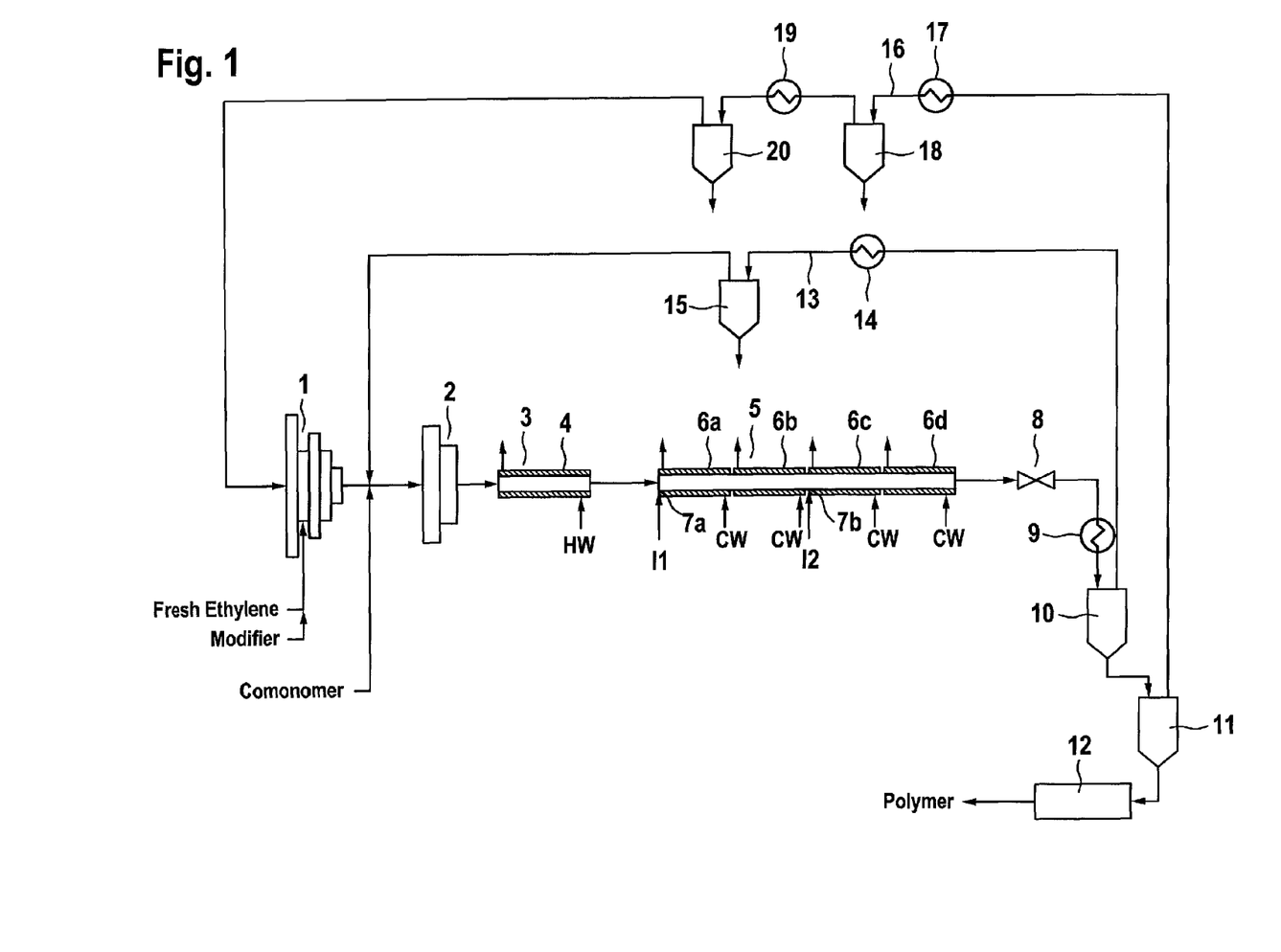
FIG. 1 shows schematically the set-up of a high-pressure polymerization unit which can be used in the process of the present invention.

Preferably the high pressure reactor is a tubular reactor, in particular a tubular reactor having a length-to-diameter ratio of greater than 1000, preferably from 10000 to 40000 and especially from 25000 to 35000. FIG. 1 shows a typical set-up for a preferred tubular polymerization reactor without however restricting the invention to the embodiments described therein.

The fresh ethylene, which is usually under a pressure of 1.7 MPa, is firstly compressed to a pressure of about 30 MPa by means of a primary compressor (1) and then compressed to the reaction pressure of about 300 MPa using a high pressure compressor (2). The molecular weight regulator is added to the primary compressor (1). The reaction mixture leaving the high pressure compressor (2) is fed to a pre-heater (3), which is equipped with a heating jacket (4), to which a heating medium, preferably hot water or steam HW, of a temperature of from about 150 to 250° C. is fed. The reaction mixture is heated in the pre-heater (3) to the reaction start temperature of from about 120° C. to 220° C. and then conveyed to the tubular reactor (5).

The tubular reactor (5) is basically a long, thick-walled pipe, which is usually from about 0.5 km to 4 km, preferably from 1.5 km to 3 km and especially from 2 km to 2.5 km long. The inner diameter of the pipe is usually in the range of from about 30 mm to 120 mm and preferably from 60 mm to 90 mm. The tubular reactor (5) is equipped with a cooling jacket to remove the liberated heat of reaction from the reaction mixture by means of a cooling medium, preferably cooling water CW, of a temperature from about 100 to 220° C. The cooling jacket is divided in four zones (6a) to (6d), which are all separately fed with the cooling medium.

The tubular reactor (5) shown in FIG. 1 has two spatially separated initiator injection points (7a) and (7b), where the two initiators or initiator mixtures 11 and 12 are fed to the reactor, thus creating two reaction zones. Preferably the number of initiator injection points and reaction zones is from 2 to 6 and in particular 2, 3 or 4 and most preferably 4.

The reaction mixture leaves the tubular reactor (5) through a high-pressure let-down valve (8) and passes a post reactor cooler (9). Thereafter, the resulting polymer is separated off from unreacted ethylene and other low molecular weight compounds (monomers, oligomers, polymers, additives, solvent, etc.) by means of a high-pressure separator (10) and a low-pressure separator (11), discharged and pelletized via an extruder and granulator (12).

The ethylene which has been separated off in the high-pressure separator (10) is fed back to the inlet end of the tube reactor (5) in the high-pressure circuit (13) at 30 MPa. It is first freed from other constituents in at least one purification stage and then added to the monomer stream between primary compressor (1) and high pressure compressor (2). FIG. 1 shows one purification stage consisting of a heat exchanger (14) and a separator (15). It is however also possible to use a plurality of purification stages. The high-pressure circuit (13) usually separates waxes.

The ethylene which has been separated off in the low-pressure separator (11), which further comprises, inter alia, the major part of the low molecular weight products of the polymerization (oligomers) and the solvent of the initiators, is worked up in the low-pressure circuit (16) at a pressure of from about 0.1 to 0.4 MPa in a plurality of separators with a heat exchanger being located between each of the separators. FIG. 1 shows two purification stages consisting of heat exchangers (17) and (19) and separators (18) and (20). It is however also possible to use only one purification stages or preferably more than two purification stages. The low-pressure circuit (16) usually separates oil and waxes.

Different configurations for suitable tubular polymerization reactor are of course also possible. In the preparation of highly viscous products, e.g. MFR (190° C./2.16 kg)<1 g/10 min, it can be advantageous to add the monomer or monomers not only at the inlet of the reactor tube but to feed in monomers, preferably cooled monomers, at a plurality of different points on the reactor. This is particularly preferably done at the beginning of further reaction zones.

According to the process of the present invention the polymerization is carried out with closed-loop control by a model based predictive controller. Preferred controlled variables are product quality related parameters like density, melt flow rate (MFR) and, if an ethylene copolymer is prepared, copolymer composition as well as production rate and energy consumption and specific consumptions of additives like initiators or modifiers.

The process of the present invention comprises the step of feeding target values for the density and the MFR of the ethylene homopolymer or copolymer to be prepared and, if an ethylene copolymer is prepared, the copolymer composition of the ethylene copolymer to be prepared as setpoint ranges to the controller. These target values correspond to the ranges, in which the density, the MFR and, if appropriate, the copolymer composition of the ethylene polymers produced in the high-pressure reactor have to be in steady-state production so that the obtained ethylene polymers can be classified as in-spec. In case of grade changes the target values are those of the products which shall be produced after the grade change.

For carrying out the process of the present invention the employed density can be any density which can be determined reproducibly for LDPE's. Preferably the density, which is used in the present process as target value and controlled variable is the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes. Similarly, for carrying out the process of the present invention in principle all conditions for measuring MFR values can be applied as long as the measurement results in distinguishable values which vary with changing reaction condition. However, preferably measuring conditions are applied, which are routinely used for evaluating ethylene polymers according to DIN EN ISO 1133:2005. The most preferred melt flow rate according to the present invention is the MFR determined according to DIN EN ISO 1133:2005, condition D at a temperature of 190° C. under a load of 2.16 kg.

The process of the present invention comprises the step of calculating by means of a model based on data measured in the high-pressure polymerization unit a value for the density of the ethylene homopolymer or copolymer currently prepared in the high-pressure reactor. Density is a property of a polyethylene which takes time to be measured. Accordingly, for controlling a production process there has been the need to obtain information regarding the density of the produced polyethylene immediately. Therefore so-called soft sensors were developed. Density soft sensors are first principle models comprising kinetics, thermodynamics and mass balances. They use on-line information from the polymerization unit like flow rates or temperature. In case of a high-pressure polymerization of ethylene suitable data which can be measured in the high-pressure polymerization unit to calculate the density are flow rates of ethylene, comonomer if used, initiator, modifier and cooling water as well as the temperatures in different parts of the reactor. Soft sensors for determining the density of an ethylene homopolymer or copolymer are known in the art and are for example described in C.-U. Schmidt, F.-O. Mähling: "Model Application in the Polyolefin Industry", 7th Int. Workshop on PRE, Hamburg 8-10 Oct. 2001, Dechema Monographs Vol. 137, Wiley-VCH, p 147.

Independently of calculating the density, the process of the present invention further comprises the step of calculating by means of a model based on data measured in the high-pressure polymerization unit a value for the MFR of the ethylene homopolymer or copolymer currently prepared in the high-pressure reactor. Also MFR is a property which takes time to be measured and therefore soft sensors were developed. MFR soft sensors are often data driven models which use information from the reactor and from the extruder. MFR soft sensors are for example described in Ind. Eng. Chem. Res., 2005, 44, p 8. A further method of constructing a MFR soft sensor is described in WO 2008/064843.

If an ethylene copolymer is prepared, independently of calculating the density and the MFR, the present invention further comprises the step of calculating by means of a model based on data measured in the high-pressure polymerization unit a value for the copolymer composition of the ethylene copolymer currently prepared in the high-pressure reactor. The copolymer composition has to be understood as being an average value for the ratio of the monomers from which the copolymer was prepared. Preferably the copolymer composition is expressed in weight-percent of the monomers.

The accordingly calculated values for density, MFR and, if an ethylene copolymer is prepared, copolymer composition are fed as controlled variables to the model based predictive controller. Such controllers are well known in the art and their use is very often designated as advanced process control (APC). Various vendors offer software to realize APC. This software however supplies only a configuration environment to implement the specific design.

Furthermore, additional controlled variables, which can directly be measured in the high-pressure polymerization unit, are fed to the model based predictive controller. Such additional controlled variables are for example constraints like:
production rate
temperature and pressure at the suction side of the compressor;
temperature and pressure at the discharge side of the compressor;
minimum and maximum temperatures of the temperature profile;
temperature and pressure in the heat exchangers of the high-pressure circuit;
temperature and pressure in the heat exchangers of the low-pressure circuit; and
valve opening constraints.

The controller calculates based on data directly measured in the high-pressure polymerization unit and based on the values for density, MFR and, if an ethylene copolymer is prepared, copolymer composition provided by the soft sensors as outputs setpoint ranges regarding manipulated variables of the high-pressure polymerization unit. These directly measurable data are further controlled variables. The adjusting of the manipulated variables to these setpoint ranges effects that the target values of the process are met, that further controlled variables like production rate and energy consumption are optimized and that the constraints are kept.

Suitable manipulated variables to adjust the high-pressure polymerization process are for example:
the cooling water temperature in each cooling water zone;
the cooling water flow rate in each cooling water zone;
the modifier flow rate;
the reactor pressure;
the ethylene feed and the split of the feeds in case of side feeds of ethylene;
the comonomer feed if comonomer is used;

the hot water temperature in the ethylene pre-heater;
the bleed; and
the initiator flow rate and the composition of the initiator mixture if more then one initiator is used in each reaction zone.

Essential for the process of the present invention is that at least the calculation of the setpoint ranges for feeding the free-radical polymerization initiator, i.e. the setpoint ranges for the initiator flow rate in each reaction zone and also the composition of the initiator mixture in each reaction zone if more then one initiator is used, is carried out with a sufficiently high frequency. Thus, this calculation is repeated at least every 3 minutes. Preferably the cycle time for repeating the calculation of the outputs regarding feeding the initiator is from 1 second to 3 minutes, more preferably from 3 to 60 seconds, in particular from 5 to 30 seconds and especially from 10 to 20 seconds.

Figure 2:
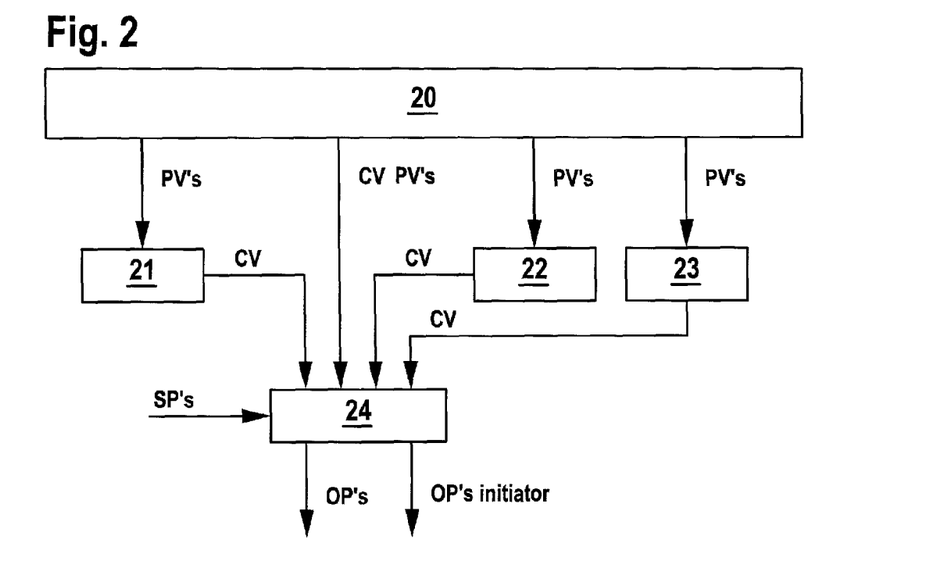
FIG. 2 depicts the general scheme for controlling the process of the present invention and FIG. 3 shows the general scheme for a preferred embodiment of the process.

The general scheme for controlling the process of the present invention is depicted in FIG. 2. Polymerization unit (20) is a high-pressure polymerization unit as for example shown in FIG. 1. Values for process variables (PV's) such as temperatures, pressures or flow rates measured in polymerization unit (20) are fed to density model (21), which calculates the value for the density of the ethylene homopolymer or copolymer currently prepared in the high-pressure reactor and feeds that value as value for a controlled variable (CV) to controller (24). In parallel, values for process variables (PV's) such a temperatures, pressures or flow rates measured in polymerization unit (20) are fed to MFR model (22), which calculates the value for the MFR of the ethylene homopolymer or copolymer currently prepared in the high-pressure reactor and feeds that value as value for a controlled variable (CV) to controller (24). Furthermore, if ethylene copolymers are prepared values for process variables (PV's) such as temperatures, pressures or flow rates measured in polymerization unit (20) are fed in parallel to composition model (23), which calculates the value for the copolymer composition of the ethylene copolymer currently prepared in the high-pressure reactor and feeds that value as value for a controlled value (CV) to controller (24). Setpoint ranges (SP's) such as target values for density and MFR of the ethylene homopolymer or copolymer to be prepared and target values for the copolymer composition of the ethylene copolymer to be prepared if an ethylene copolymer is prepared are fed to controller (24). Further, also values for process variables such as temperatures, pressures or flow rates which are directly measurable controlled variable (CV PV's) are measured in polymerization unit (20) and fed to controller (24). Controller (24) then calculates as outputs setpoint ranges for manipulated variables which can be used to adjust the high-pressure polymerization process. These setpoint ranges are setpoint ranges which do not refer to feeding of the free-radical polymerization initiator (OP's) and setpoint ranges for feeding the free-radical polymerization initiator (OP's initiator).

In a preferred embodiment of the present invention the controller is divided in a master controller and a slave controller. The target values and the calculated values for density, MFR and, if an ethylene copolymer is prepared, the copolymer composition are fed to the master controller. The master controller calculates based on data measured in the high-pressure polymerization unit and the values for density, MFR and the copolymer composition, if an ethylene copolymer is prepared, as outputs setpoint ranges for manipulated variables of the high-pressure polymerization unit, which however do not include setpoint ranges for feeding the free-radical polymerization initiator but include instead setpoint ranges for the maximum temperature of each reaction zone of the high-pressure reactor. These setpoint ranges for the maximum temperature of each reaction zone are fed to the slave controller and the slave controller calculates based on data measured in the high-pressure polymerization unit and these setpoint ranges as outputs setpoint ranges for manipulated variables of the high-pressure polymerization unit including setpoint ranges for feeding the free-radical polymerization initiator. Preferably the slave controller calculates only setpoint ranges for feeding the free-radical polymerization initiator and all other setpoint ranges for manipulated variables are calculated by the master controller.

Such a set-up of master controller and slave controller facilitates a high repetition rate of the calculation of the setpoint ranges for feeding the free-radical polymerization since only the calculation of the outputs of the slave controller has to be repeated with this high rate while the repetition of the calculation of the outputs of the master controller can be carried out with a lower rate. That means, preferably the slave controller repeats the calculation of the setpoint ranges for feeding the free-radical polymerization initiator in shorter time intervals than the master controller repeats the calculation of the setpoint ranges for the maximum temperature of each reaction zone of the high-pressure reactor.

The master controller preferably repeats the calculation of the setpoint ranges for manipulated variables of the high-pressure polymerization unit with a cycle time of from 15 seconds to 10 minutes, more preferably with a cycle time of from 30 seconds to 5 minutes and in particular with a cycle time of from 60 seconds to 2 minutes and the slave controller repeats the calculation of the setpoint ranges for feeding the free-radical polymerization initiator with a cycle time of from 1 second to 3 minutes, more preferably with a cycle time of from 3 to 60 seconds, in particular with a cycle time of from 5 to 30 seconds and especially with a cycle time of from 10 to 20 seconds.

Figure 3:
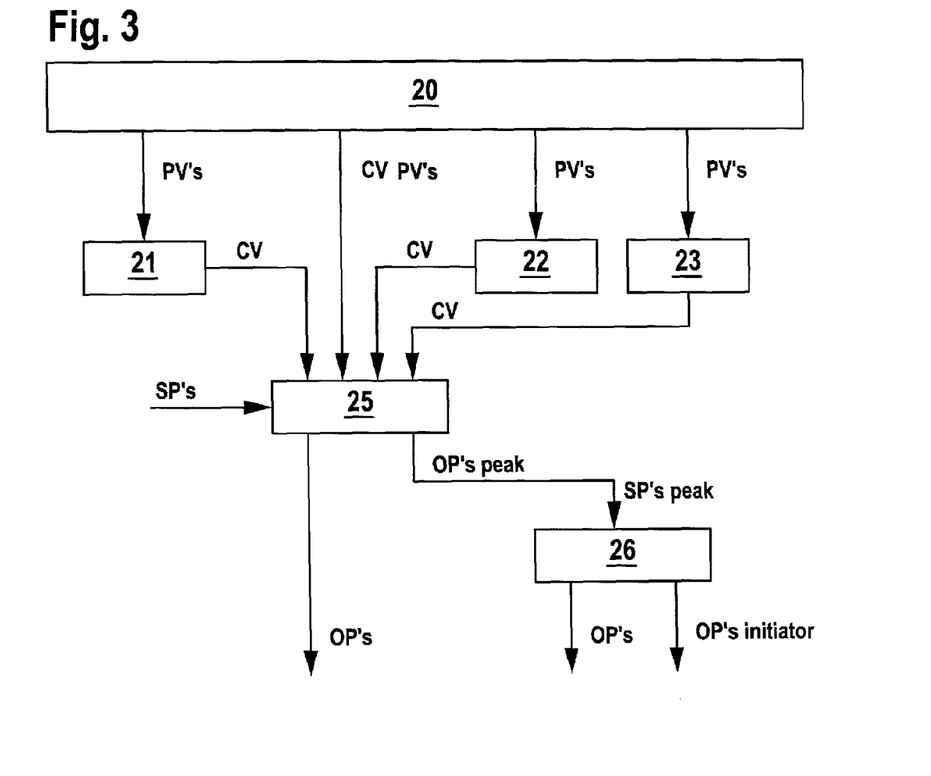

The general scheme for controlling the process of the present invention according to this preferred embodiment is depicted in FIG. 3. Values for process variables (PV's) such a temperatures, pressures or flow rates measured in polymerization unit (20) are fed to density model (21), MFR model (22) and composition model (23), which calculate independently the values for the density and the MFR of the ethylene homopolymer or copolymer currently prepared in the high-pressure reactor and, if appropriate, the value for the copolymer composition of the ethylene copolymer currently prepared in the high-pressure reactor and feed these values as values controlled variables (CV) to master controller (25). Further, also values for process variables such as temperatures, pressures or flow rates which are direct measurable controlled variable (CV PV's) are measured in polymerization unit (20) and fed to master controller (25). Setpoint ranges (SP's) such as target values for density and MFR of the ethylene homopolymer or copolymer to be prepared are fed to master controller (25). Master controller (25) then calculates as outputs (OP's) setpoint ranges for manipulated variables which can be used to adjust the high-pressure polymerization process. Such setpoint ranges however do not include setpoint ranges feeding the free-radical polymerization initiator. Master controller (25) further calculates as further output (OP's peak) setpoint ranges the maximum temperature of each reaction zone. These values are fed as setpoints for the maximum temperature of each reaction zone (SP's peak) to slave controller (26). Slave controller (26) then calculates as outputs (OP's) setpoint ranges for manipulated variables which can be used to adjust the high-pressure polymerization process including as outputs (OP's initiator) setpoint ranges for feeding the free-radical polymerization initiator.

Furthermore, we have found a method for controlling a process for the preparation of ethylene homopolymers or copolymers in the presence of free-radical polymerization initiator at from 100° C. to 350° C. and pressures in the range of from 160 MPa to 350 MPa in a high-pressure polymerization unit comprising a high-pressure reactor with one or more reaction zones, to each of which free-radical polymerization initiator is fed, using a model based predictive controller comprising the steps a) feeding target values for density and melt flow rate (MFR) of the ethylene homopolymer to be prepared as setpoint ranges to the controller if an ethylene homopolymers is prepared or feeding target values for density, MFR and copolymer composition of the ethylene copolymer of to be prepared as setpoints to the controller if an ethylene copolymer is prepared;
b) measuring data in the high-pressure polymerization unit and calculating by means of a model based on these data a value for the density of the ethylene homopolymer or copolymer currently prepared in the high-pressure reactor;
c) independently of step b), measuring data in the high-pressure polymerization unit and calculating by means of a model based on these data a value for the MFR of the ethylene homopolymer or copolymer currently prepared in the high-pressure reactor;
d) if an ethylene copolymer is prepared, independently of steps b) and c), measuring data in the high-pressure polymerization unit and calculating by means of a model based on these data a value for the copolymer composition of the ethylene copolymer currently prepared in the high-pressure reactor;
e) feeding the calculated values for the density, for the MFR and, if an ethylene copolymer is prepared, for the copolymer composition as controlled variables to the controller; and
f) measuring data in the high-pressure polymerization unit and calculating by means of the controller based on these measured data, the setpoint ranges fed in step a) and the values calculated in steps b), c) and d) as outputs setpoint ranges for manipulated variables of the high-pressure polymerization unit including setpoint ranges for feeding the free-radical polymerization initiator, wherein the calculation of the outputs regarding feeding the free-radical polymerization initiator is repeated at least every 3 minutes.

In a preferred embodiment of the controlling method the controller is divided in a master controller and a slave controller. The target values and the calculated values for density, MFR and, if an ethylene copolymer is prepared, the copolymer composition are fed to the master controller. The master controller calculates based on data measured in the high-pressure polymerization unit and the values for density, MFR and, if an ethylene copolymer is prepared, the copolymer composition as outputs setpoint ranges for manipulated variables of the high-pressure polymerization unit, which however do not include setpoint ranges for feeding the free-radical polymerization initiator but include instead setpoint ranges for the maximum temperature of each reaction zone of the high-pressure reactor. These setpoint ranges for the maximum temperature of each reaction zone are fed to the slave controller and the slave controller calculates based on data measured in the high-pressure polymerization unit and these setpoint ranges as outputs setpoint ranges for manipulated variables of the high-pressure polymerization unit including setpoint ranges for feeding the free-radical polymerization initiator. Preferably the slave controller calculates only setpoint ranges for feeding the free-radical polymerization initiator and all other setpoint ranges for manipulated variables are calculated by the master controller.

This controlling method is especially suitable for transitioning from one grade to another in a process for the preparation of ethylene homopolymers or co-polymers in the presence of free-radical polymerization initiator at from 100° C. to 350° C. and pressures in the range of from 160 MPa to 350 MPa in a high-pressure polymerization unit comprising a high-pressure reactor with one or more reaction zones, to each of which free-radical polymerization initiator is fed.

The present invention is advantageous for increasing the production rate by simultaneously keeping product specification tight. In this way the off-spec proportion can be reduced. Process safety can be increased and specific operating costs can be minimized. Grade changes can be accelerated. The production of tailor-made grades is facilitated. Moreover the invention allows energy saving, which is mainly realized in the compressors by reducing the reactor pressure to a value which however still guarantees the quality specification.

The invention is illustrated below with the aid of an example, without being restricted thereto.

EXAMPLE

A high-pressure polymerization unit comprising a tubular high-pressure reactor for the production of LDPE was equipped with a model based predictive controller according to the present invention. The reactor had the general design shown in FIG. 1 with two initiator injection points and accordingly two reaction zones. Fresh ethylene was however not only fed to the beginning of the tubular reactor but also as cooled ethylene to the beginning of the second reaction zone. The tubular reactor had in total a length of 1000 m, a diameter of 45 mm in the first reaction zone and a diameter of 55 mm in the second reaction zone. Propionaldehyde was used as molecular weight regulator in a range of 0.5 to 2.5 kg per ton of produced polyethylene. It was added to the fresh ethylene stream entering the primary compressor. The initiator was oxygen in both reaction zones. The throughput varied with producing different grades, it was however always in the range of from 13 to 17 metric tons/h. The reactor inlet pressure was varied in the range of from 250 to 320 MPa.

The installed controller was divided into a master controller and a slave controller. The master controller controlled the MFR and the density of the polymer and optimized production rate and energy consumption. Moreover several constraints were kept. Accordingly, the following controlled variables were considered:

MFR;
density;
production rate (PR);
compressor discharge temperature (CDT), i.e. temperature of the compressed ethylene leaving the compressor;
pressure in the heat exchanger of the high-pressure circuit (HEP);
pre-heater temperature (PHT), i.e. temperature of the ethylene leaving the pre-heater;
reaction zone 1 outlet temperature (RZ1OT), i.e. temperature of the reaction mixture leaving reaction zone 1;
mix-point temperature (MPT); temperature of the reaction mixture after the ethylene side stream was added;
reaction zone 2 outlet temperature (RZ2OT), i.e. temperature of the reaction mixture leaving reaction zone 2;

C2 split valve (C2SV); i.e. opening ratio of the valve regulating the ratio of ethylene feed to the beginning of the tubular reactor to ethylene feed to the beginning of the second reaction zone;

steam valve (SV); i.e. opening ratio of the valve regulating the steam flow to the heating jacket of the pre-heater; and cooling water valve (CWV) i.e. opening ratio of the valve regulating the water flow to the cooling jacket of the heat-exchanger cooling the ethylene fed to the reactor at the beginning of the second reaction zone.

To keep these controlled variables within the given limits the following manipulated variables were addressed:

maximum temperature of reaction zone 1 (MTRZ1)
maximum temperature of reaction zone 2 (MTRZ2)
modifier feed; i.e. feed of propionaldehyde (MF)
reaction zone 1 inlet temperature (RZ1IT), i.e. temperature of the reaction mixture entering reaction zone 1;
reaction zone 2 inlet temperature (RZ2IT), i.e. temperature of the reaction mixture entering reaction zone 2;
C2 split (C2S); i.e. ratio of ethylene feed to the beginning of the tubular reactor to ethylene feed to the beginning of the second reaction zone;
reactor mix-point pressure (RMPP), i.e. pressure in the reactor at the point, where ethylene is fed to the beginning of the second reaction zone; and
bleed (BL); i.e. amount of off-gas.

The interrelation between the used controlled variables and manipulated variables is given in Table 1, where a cross means that the respective controlled variable is influenced by a variation of the respective manipulated variable.

TABLE 1

|         | MTRZ1 | MTRZ2 | MF | RZ1IT | RZ2IT | C2S | RMPP | BL |
|---------|-------|-------|----|-------|-------|-----|------|----|
| MFI     | x     | x     | x  |       |       |     | x    | x  |
| density | x     | x     | x  |       |       |     | x    |    |
| PR      | x     | x     |    |       |       | x   | x    |    |
| CDT     | x     | x     | x  | x     |       |     | x    |    |
| HEP     |       |       |    |       |       |     |      |    |
| PHT     | x     | x     |    | x     |       |     |      |    |
| RZ1OT   | x     |       | x  | x     |       |     | x    |    |
| MPT     |       |       |    |       | x     |     |      |    |
| RZ2OT   |       | x     | x  |       | x     |     | x    |    |
| C2SV    |       |       |    |       |       | x   |      |    |
| SV      |       |       |    | x     |       | x   | x    |    |
| CWV     |       |       |    |       | x     |     |      |    |

A commercial software (RMPCT of Honeywell GmbH, Offenbach/Main, Germany) was implemented in the master controller for carrying out the calculation. The calculation of the master controller was executed once per minute.

Standard controllers were addressed for the manipulated variables except for the maximum temperatures in two reaction zones. The values for the maximum temperatures in reaction zones 1 and 2 (MTRZ1 and MTRZ2), which were calculated by the master controller as manipulated variables, were fed as controlled variables to the slave controller.

The slave controller addressed the two oxygen feeds as manipulated variables. The resulting interrelation between the used controlled variables and manipulated variables is shown in Table 2, where RZ1IF stands for reaction zone 1 initiator feed and RZ2IF stands for reaction zone 2 initiator feed.

TABLE 2

|       | RZ1IF | RZ2IF |
|-------|-------|-------|
| MTRZ1 | x     |       |
| MTRZ1 |       | x     |

Commercial software (RMPCT of Honeywell GmbH, Offenbach/Main, Germany) was implemented in the slave controller. The calculation of slave controller was executed 4 times per minute.

By running the high-pressure tubular reactor polymerization plant with the model based predictive controller for 1 year producing 9 different grades an average production increase of 5.5% could be achieved with respect to a previous period with an identical product split when the polymerization plant was controlled by the operators. At the same time the energy consumption decreased. A saving of about 3% with respect to the previous period with the identical product split could be realized. The process capability to meet the quality specification increased. The value Cp as the width of specification divided by the six fold of the standard deviation rose from 0.7 to 1.9 for MFI; that means the variance of the MFR was considerably reduced.

We claim:

1. A process for the preparation of ethylene homopolymers or copolymers in the presence of a free-radical polymerization initiator at from 100° C. to 350° C. and pressures in the range of from 160 MPa to 350 MPa in a high-pressure polymerization unit comprising a high-pressure reactor with at least one reaction zone, to each of which free-radical polymerization initiator is fed, which is controlled by a model based predictive controller carrying out the steps:

a) feeding target values for density and melt flow rate (MFR) of the ethylene homopolymer to be prepared as setpoint ranges to the controller when an ethylene homopolymer is prepared or feeding target values for density, MFR and copolymer composition of the ethylene copolymer of to be prepared as setpoint ranges to the controller when an ethylene copolymer is prepared;

b) measuring data in the high-pressure polymerization unit and calculating by means of a model based on these data a value for the density of the ethylene homopolymer or copolymer currently prepared in the high-pressure reactor;

c) independently of step b), measuring data in the high-pressure polymerization unit and calculating by means of a model based on these data a value for the MFR of the ethylene homopolymer or copolymer currently prepared in the high-pressure reactor;

d) when an ethylene copolymer is prepared, independently of steps b) and c), measuring data in the high-pressure polymerization unit and calculating by means of a model based on these data a value for the copolymer composition of the ethylene copolymer currently prepared in the high-pressure reactor;

e) feeding the calculated values for the density, for the MFR and, when an ethylene copolymer is prepared, for the copolymer composition as controlled variables to the controller; and f) measuring data in the high-pressure polymerization unit and calculating by means of the controller based on these measured data, the setpoint ranges fed in step a) and the values calculated in steps b), c) and d) as outputs setpoint ranges for manipulated variables of the high-pressure polymerization unit including setpoint ranges for feeding the free-radical polymerization initiator, wherein the calculation of the setpoint ranges for feeding the free-radical polymerization initiator is repeated at least every 3 minutes.

2. The process according to claim 1, wherein the controller comprises a master controller and a slave controller, and the target values and the calculated values for density, MFR and, when an ethylene copolymer is prepared, the copolymer composition are fed to the master controller;

the master controller calculates based on data measured in the high-pressure polymerization unit and the values calculated in steps b), c) and d) as outputs setpoint ranges for manipulated variables of the high-pressure polymerization unit, however excluding setpoint ranges for feeding the free-radical polymerization initiator and instead including setpoint ranges for the maximum temperature of each reaction zone of the high-pressure reactor;

the setpoint ranges for the maximum temperature of each reaction zone are fed to the slave controller, and the slave controller calculates based on data measured in the high-pressure polymerization unit and the setpoint ranges for the maximum temperature of each reaction zone as outputs setpoint ranges for manipulated variables of the high-pressure polymerization unit including setpoint ranges for feeding the free-radical polymerization initiator.

3. The process according to claim 2, wherein the slave controller calculates only setpoint ranges for feeding the free-radical polymerization initiator.

4. The process according to claim 2, wherein the slave controller repeats the calculation of the setpoint ranges for feeding the free-radical polymerization initiator in shorter time intervals than the master controller repeats the calculation of the setpoint ranges for the maximum temperature of each reaction zone of the high-pressure reactor.

5. The process according to claim 4, wherein the master controller repeats the calculation with a cycle time of from 15 seconds to 10 minutes and the slave controller repeats the calculation with a cycle time of from 1 second to 3 minutes.

6. The process according to claim 1, wherein the high-pressure reactor is a tubular reactor.

7. The process according to claim 1, wherein the free-radical polymerization initiator is selected for each reaction zone independently of each other from the group consisting of air, oxygen, azo compounds and organic peroxides.

8. The process according to claim 7, wherein the free-radical polymerization initiator is in all reaction zones a mixture of at least two different azo compounds or organic peroxides.

9. The process according to claim 7, wherein the setpoint ranges for feeding the free-radical polymerization initiator include setpoint ranges for the composition of the initiator mixtures.

10. A method of controlling a process for the preparation of ethylene homopolymers or copolymers in the presence of free-radical polymerization initiator at from 100° C. to 350° C. and pressures in the range of from 160 MPa to 350 MPa in a high-pressure polymerization unit comprising a high-pressure reactor with at least one reaction zone, to each of which free-radical polymerization initiator is fed, based on a mathematical process model comprising the steps:

a) feeding target values for density and melt flow rate (MFR) of the ethylene homopolymer to be prepared as setpoint ranges to the controller when an ethylene homopolymers is prepared or feeding target values for density, MFR and copolymer composition of the ethylene copolymer of to be prepared as setpoint ranges to the controller when an ethylene copolymer is prepared;

b) measuring data in the high-pressure polymerization unit and calculating by means of a model based on these data a value for the density of the ethylene homopolymer or copolymer currently prepared in the high-pressure reactor;

c) independently of step b), measuring data in the high-pressure polymerization unit and calculating by means of a model based on these data a value for the MFR of the ethylene homopolymer or copolymer currently prepared in the high-pressure reactor;

d) when an ethylene copolymer is prepared, independently of steps b) and c), measuring data in the high-pressure polymerization unit and calculating by means of a model based on these data a value for the copolymer composition of the ethylene copolymer currently prepared in the high-pressure reactor;

e) feeding the calculated values for the density, for the MFR and, when an ethylene copolymer is prepared, for the copolymer composition as controlled variables to the controller; and f) measuring data in the high-pressure polymerization unit and calculating by means of the controller based on these measured data, the setpoint ranges fed in step a) and the values calculated in steps b), c) and d) as outputs setpoint ranges for manipulated variables of the high-pressure polymerization unit including setpoint ranges for feeding the free-radical polymerization initiator, wherein the calculation of the setpoint ranges for feeding the free-radical polymerization initiator is repeated at least every 3 minutes.

11. The method according to claim 10, wherein the controller comprises a master controller and a slave controller, and the target values and the calculated values for density and MFR are fed to the master controller;

the master controller calculates based on data measured in the high-pressure polymerization unit and the values calculated in steps b), c) and d) as outputs setpoint ranges for manipulated variables of the high-pressure polymerization unit, however excluding setpoint ranges for feeding the free-radical polymerization initiator and instead including setpoint ranges for the maximum temperature of each reaction zone of the high-pressure reactor;

the setpoint ranges for the maximum temperature of each reaction zone are fed to the slave controller, and the slave controller calculates based on data measured in the high-pressure polymerization unit and the setpoint ranges for the maximum temperature of each reaction zone as out-puts setpoint ranges for manipulated variables of the high-pressure reactor including setpoint ranges for feeding the free-radical polymerization initiator.

12. A method for transitioning from one grade to another in a process for the preparation of ethylene homopolymers or copolymers in the presence of free-radical polymerization initiator at from 100° C. to 350° C. and pressures in the range of from 160 MPa to 350 MPa in a high-pressure polymerization unit comprising a high-pressure reactor with at least reaction zone, to each of which free-radical polymerization initiator is fed, using a control method according to claim 10.

* * * * *